United States Patent [19]

Kampfer et al.

[11] Patent Number: 4,563,565
[45] Date of Patent: Jan. 7, 1986

[54] METHOD FOR FORMING A PERIPHERAL EDGE ON CONTACT LENSES

[75] Inventors: Robert D. Kampfer, Lake St. Croix Beach; Randall S. Blum, Woodbury, both of Minn.

[73] Assignee: Minnesota Mining and Manufacturing Company, St. Paul, Minn.

[21] Appl. No.: 471,513

[22] Filed: Mar. 2, 1983

[51] Int. Cl.⁴ .................... B23K 26/08; G02C 7/04
[52] U.S. Cl. .................. 219/121 LJ; 219/121 LN; 219/121 LY; 351/160 R
[58] Field of Search .......... 219/121 LJ, 121 LH, 219/121 LE, 121 LG, 121 LN, 121 LY; 351/161, 160 R

[56] References Cited

U.S. PATENT DOCUMENTS

| | | | |
|---|---|---|---|
| 3,538,298 | 11/1970 | Duston et al. | 219/121 |
| 3,571,555 | 3/1971 | Townes et al. | 219/121 |
| 3,700,850 | 10/1972 | Lumley et al. | 219/121 |
| 3,749,878 | 7/1973 | Sullivan et al. | 219/121 |
| 3,909,582 | 9/1975 | Bowen | 219/121 LJ |
| 3,971,910 | 7/1976 | Marschalko et al. | 219/121 FS X |
| 4,170,726 | 10/1979 | Okuda | 219/121 |
| 4,194,814 | 3/1980 | Fischer et al. | 351/160 R |
| 4,219,721 | 8/1980 | Kamen et al. | 219/121 LJ X |
| 4,268,133 | 5/1981 | Fischer | 351/161 |
| 4,307,046 | 12/1981 | Neefe | 219/121 LN X |
| 4,455,893 | 6/1984 | Astero | 219/121 LH X |

FOREIGN PATENT DOCUMENTS

WO84-00319  5/1982  PCT Int'L Appl.

*Primary Examiner*—C.L. Albritton
*Assistant Examiner*—Alfred S. Keve
*Attorney, Agent, or Firm*—Donald M. Sell; James A. Smith; James V. Lilly

[57] ABSTRACT

A method of forming edges on contact lenses prepared from laser-machinable, organic polymers wherein the edge is formed by contacting the lens with a laser beam having a wavelength which is absorbed by the polymer. The radiated energy supplied to the polymer by the laser beam is such that the ratio of heat absorbed in vaporization of the polymer to heat absorbed by the polymer bulk is maximized.

26 Claims, 5 Drawing Figures

METHOD FOR FORMING A PERIPHERAL EDGE ON CONTACT LENSES

FIELD OF THE INVENTION

This invention relates to techniques for forming a peripheral edge on contact lenses. More particularly it relates to techniques for forming contoured, peripheral edge on contact lenses prepared from laser-machinable, organic polymers by the use of a laser-supplied energy.

Laser-machinable organic polymers are organic polymers which have a Ranfer value of three or less. The Ranfer value is a measure of the smoothness of the edge produced by the use of laser-supplied energy. Techniques for determining the Ranfer value are described hereinafter.

BACKGROUND ART

Prior techniques of forming edges on contact lenses have involved the use of hand or lathe cutting. Such techniques are time consuming and require the use of skilled manpower. Additionally, these techniques frequently fail to provide reproducible results.

It has now been discovered that the disadvantages of the prior art are overcome by the use of a focussed beam of laser-supplied energy to provide the desired peripheral edge on contact lenses. The method of the invention provides a contoured, peripheral edge on the contact lens quickly, reproducibly, and with a minimum of manpower. Preferably, the edge produced by the present invention requires no additional processing (e.g., polishing) to render it physiologically acceptable. As used in the present invention the term "physiologically acceptable edge" means one which is comfortable in the eye, aids in tear pumping under the lens, and has a smooth, continuous profile. Such edges are virtually free from irregularities such as grains, lumps, bumps, grooves, scallops, burrs, pits, bubbles, and so forth when viewed under $50 \times$ to $100 \times$ magnification.

The use of lasers to machine workpieces is known. See, for example, U.S. Pat. Nos. 3,538,298; 3,571,555; 3,700,850; 3,749,878; 4,307,046, and 4,170,726. However, none of these patents is directed to the formation of peripheral edges on contact lenses.

For example, U.S. Pat. No. 3,538,298 discloses a method for balancing a rotational object by cutting it with a laser pulse having a focal diameter equal to the spacing between two annular grooves in the object. The grooves are employed to eliminate the formation of a recast layer during cutting.

U.S. Pat. No. 3,571,555 discloses an apparatus and technique for laser machining wherein the laser is directed through a dielectric material toward a workpiece. The dielectric material acts as a waveguide to minimize divergence of the laser beam.

U.S. Pat. No. 3,700,850 discloses a method for detecting the amount of material removed from a workpiece by a laser in which sensors attached to the workpiece measure the time it takes for the accoustical shock generated by the laser to traverse the workpiece.

U.S. Pat. No. 3,749,878 discloses a gas assisted laser cutting apparatus wherein a stream of gas and a laser beam are directed through a nozzle toward a workpiece. The gas is used primarily to sweep the debris created by laser cutting away from the machined area.

U.S. Pat. No. 4,307,046 discloses a method of cutting spherical, aspheric and toric optical surfaces on contact lenses so as to simultaneously machine and polish the optical surfaces. The edges of the contact lens are provided by the mold in which the contact lens blank is cast. See FIG. 4.

U.S. Pat. No. 4,170,726 discloses a method for working the outer periphery of a workpiece wherein a workpiece is rotated while being irradiated tangentially with a laser beam. The laser beam melts the workpiece in the area of irradiation. The workpieces illustrated in this patent are cylindrical bodies rather than thin disc-like bodies such as contact lenses.

None of the above patents either recognizes the difficulties encountered in laser cutting polymeric materials or suggests a precise method of overcoming such difficulties. Thus, it has been found that the energy supplied to the polymer by the laser must be controlled so that undesirable heating of the polymer does not occur. While the exact mechanism by which the polymer is cut by the laser is not fully understood, it is believed that polymers generally have low thermal diffusivity and conductivity constants. As a result, heat may build up in the polymer in the area around the point where the laser beam strikes the polymer. If this area (sometimes referred to as the heat-affected zone) extends too deeply beneath the surface of the polymer, the heat build-up will bring this subsurface polymer to a temperature sufficient to cause subsurface explosions thereby forming an unacceptable edge. Accordingly, the energy supplied to the polymer must be carefully controlled so as to minimize the depth of the heat-affected zone.

SUMMARY OF THE INVENTION

In accordance with the present invention there is provided a method of forming a contoured, peripheral edge on a contact lens prepared from a laser-machinable, organic polymer, said method comprising the steps of providing a focussed laser beam having
(a) a wavelength which is absorbed by the polymer and
(b) a beam energy wherein the rate of radiated energy supplied to the polymer is such that the ratio of heat absorbed in vaporization of the polymer ($H_{AV}$) to the heat absorbed by the polymer bulk ($H_{AB}$) is maximized; and contacting said lens with said laser beam at a distance from the center point of the lens so as to form the desired peripheral edge.

DESCRIPTION OF THE DRAWINGS

The present invention will be further described with reference to the accompanying drawings wherein like reference characters refer to the same elements throughout the several views and wherein.

DETAILED DESCRIPTION

Figure 1:
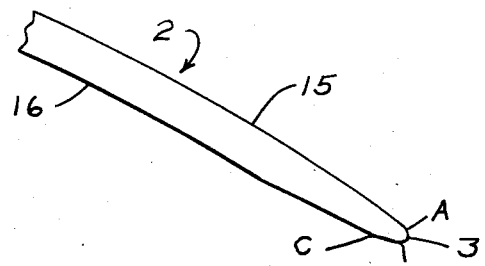
FIG. 1 is an enlarged edge view in section of a portion of a contact lens showing one embodiment of a contoured, peripheral edge produced according to the method of the present invention.

The method of the invention can be utilized to provide peripheral edges on contact lenses made from laser-machineable organic polymers, that is organic polymers which have a Ranfer value of three or less. As noted previously, the Ranfer value is a measure of the smoothness of the cut surface as represented by the number and type of small scale defects (e.g., pits, bubbles, grains, etc.) present. This characteristic, sometimes referred to as cleanliness, is rated on a scale of 1 to 5 with "1" indicating a smooth cut surface with no discernable bubbles or pits and only small (i.e., 0.01 millimeter (mm) size or less) particles of debris; "2" indicating a slightly grainy cut surface with small bubbles and pits over no more than 2% of the surface; "3" indicating a moderately grainy cut surface with bubbles and pits over from 2–5% of the surface; "4" indicating a very grainy cut surface with bubbles and pits over 5–20% of the surface; and "5" indicating a very grainy cut surface with bubbles and pits over 20 or more percentage of the surface. Cleanliness values are determined by examining the cut surface under 100×magnification.

The Ranfer value is determined according to the following procedure.

A test apparatus is supplied which comprises a source of laser-supplied energy (i.e., a Model 42 CW (continuous wave) carbon dioxide laser available from Coherent, Inc.), a lens for focussing the laser beam, and a rotatable cutting platform. The apparatus is turned on and adjusted to provide a focussed beam by placing a section of cardboard on the cutting platform and moving the focussing lens along the longitudinal axis of the laser beam. Burn holes are made in the cardboard at various positions of the lens when the source is set at a power in the range of 5 to 10 watts ($9.8 \times 10^3$ to $1.96 \times 10^4$ watts/cm$^2$ for a beam having a 10 mil (0.025 cm) diameter) and a burn time in the range of 2 to 10 milliseconds (msec). The burn holes are examined under 20×power to determine the postion at which the smallest hole was obtained. This hole should not exceed 0.02 cm$^2$.

A section of candidate polymer is supplied which is at least 0.2 mm thick and is large enough to allow a circular cut of from 9 to 11 mm in diameter. The candidate polymer is placed on the platform. The platform is set at separate constant rotational speeds of 200, 400, 600 and 800 rpm. The time necessary to complete one revolution of the platform is determined and the duration of the exposure of the candidate material to the lens is set for this time for each rotational speed. One revolution cuts are made at each rotational speed on each of several sections of the candidate polymer, replacing each section after each cut with a fresh section. Starting from near zero watts power, the incident power is increased by 2–3 watts on each successive cut at each rotational speed until a maximum power of approximately 30 watts is reached. Each sample is cut with a razor blade so as to expose the cut surface. The surface is observed visually under 100×power through a microscope, and assigned a Ranfer value using the above criteria. The Ranfer values are recorded on a two-dimensional graph having the power setting and the rotational speed as axes. If a region exists where the Ranfer values are less than three, the polymer is laser-machinable.

A wide variety of organic polymers are laser-machinable. Preferably they are crosslinked materials. Additionally it is preferred that they be prepared from compositions which contain less than 50 weight percent, and more preferably less than 40 weight percent, of an acrylate or a methacrylate monomer. Additionally, the laser-machinable polymers useful in the invention contain less than 2 weight percent of hydroxyalkyl acrylate or methacrylate.

Representative examples of laser-machinable, crosslinked organic polymers include both polysiloxanes that contain hydrophilic side chains and polymers prepared from telechelic perfluoropolyether monomers. Polysiloxanes useful in the present invention, and techniques for their preparation are known. See, for example, U.S. Pat. Nos. 4,136,250; 4,259,467; 4,261,875; and 4,227,595. A preferred class of such polysiloxanes has the formula

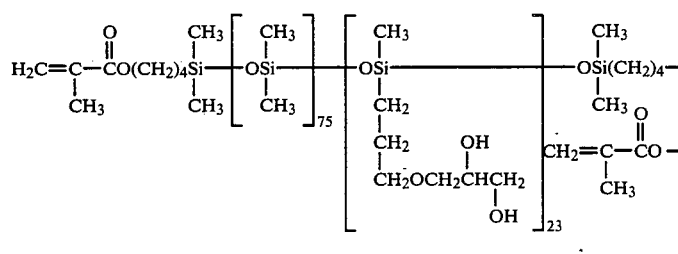

The preparation of this polysiloxane is described in Example XXV of U.S. Pat. No. 4,259,467.

Telechelic perfluoropolyether monomers which may be employed to prepare polymers useful in the present invention, together with polymers prepared therefrom, are disclosed in U.S. Pat. Nos. 3,505,229; 3,699,145; 3,766,251; 3,810,874; 3,810,875; 3,814,741; 3,882,193; 4,321,404; and copending applications Ser. Nos. 340,473 filed Jan. 18, 1982 and 447,605 filed Dec. 13, 1983.

The telechelic perfluoropolyether monomers useful in the invention preferably have a backbone of perfluorooxyalkyl units, a number average molecular weight between 500 and 15,000, and at least one group that can either be polymerized to form a polymer or reacted to form a polymer. Within this class of materials, it is preferred that the backbone have the formula

(FORMULA I)

wherein "p" represents the number of —C$_k$F$_{2k}$O— randomly distributed, repeating subunits present in the backbone and is an integer of from 3 to 200; "q" is an integer of from 1 to 4; and "k" may be the same or different within each of the —$C_kF_{2k}O$— subunits and is an integer of from 1 to 4.

Preferably the backbone has the formula

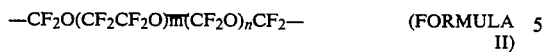 (FORMULA II)

wherein m and n are numbers providing a number average molecular weight of 500 to 15,000 to the backbone and independently have a value of from 1 to 120. Additionally, the sum of m and n is from 7 to 120 and the ratio of m/n is from 0.2/1 to 5/1.

A preferred class of telechelic perfluoropolyether monomers has the formula

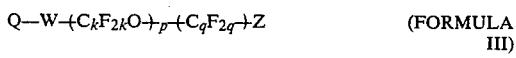 (FORMULA III)

wherein

Q is either a group that can be polymerized or a group that can be reacted with a coreactant to form a polymer;

W is a connecting group; and

Z is —WQ or fluorine.

If Q is a polymerizable group, it is preferred that the monomer have a polymerizable group functionality in the range 1.5 to 2. If Q is a reactive group, it is preferred that the monomer have a reactive group functionality of 2.

Included among reactive Q groups useful in Formula III are

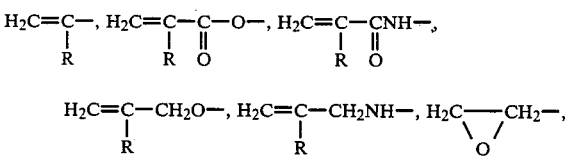

—NCO, —COOH, —OH, —$NR_2$, —SR, —$SiR_gR^1$, —CN, —$OSO_2CF_3$, —OCOCl, —OCN, —N(R)CN, —I, —CHO, —$CH(OR)_2$, —$SO_2Cl$, —C(OR)=NH, —$C(NH_2)$=NH and the like wherein R is selected from hydrogen, lower alkyl (i.e., $C_1$ to $C_4$) and aryl; $R^1$ is selected from halogen, —OR, and

and —CH=$CH_2$, and "g" is 0, 1, 2, or 3.

Included among useful W groups in Formula III are divalent linking moieties which include a covalent bond. Examples of other useful W moieties include

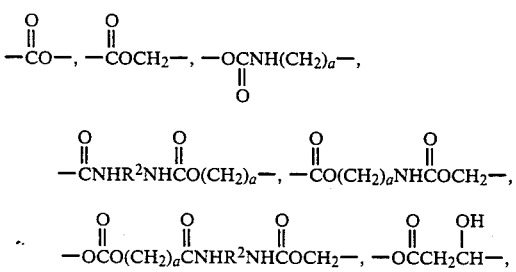

—$CH_2OCH_2$— wherein "a" is an integer of from 1 to 12, $R^2$ is selected form a divalent aliphatic group having from 2 to 14 carbon atoms, a divalent 5- or 6-membered cyclic group having from 5 to 14 carbon atoms, and an arylene group having from 6 to 14 carbon atoms.

A more preferred class of telechelic perfluoropolyether monomers has the formula

 (FORMULA IV)

wherein $Q^1$ is a reactive group selected from the group consisting of

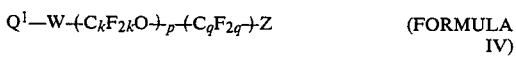

—NCO, —COOH, —OH, and

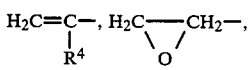

wherein $R^4$ is hydrogen or methyl, and Z, W, k, q, and p are the same as defined above.

A preferred subclass of Formula IV monomers employs ethylenically unsaturated Q groups and may be represented by the formula

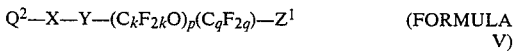 (FORMULA V)

wherein $Q^2$ is selected from

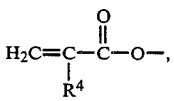 (A)

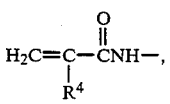 (B)

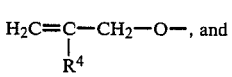 (C)

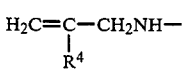 (D)

X is selected from a convalent bond (E)

-continued

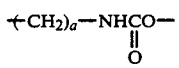 (F)

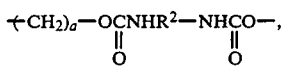 (G)

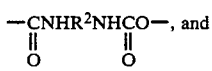 (H)

 (I)

Y is selected from

 (J)

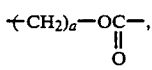 (K)

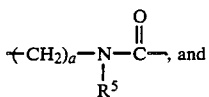 (L)

 (M)

wherein $R^5$ is a lower alkyl group having 1 to 4 carbon atoms, $R^4$ and "a" are as defined above, and "b" is an integer of from 1 to 12; provided that when (1) Q is (A) or (B), then X is selected from (E), (F), or (G) and Y is selected from (J), (K), or (L);

(2) Q is (C) then either
 (i) X is (E) and Y is (M), or
 (ii) X is selected from (E), (F), (G), (H), or (I) and Y is selected from (J), (K), or (L); and (3) Q is (D) then either
 (i) X is (E) and Y is (M), or
 (ii) X is selected from (H) and (I) and Y is selected from (J), (K), or (L); and $Z^1$ is selected from $-OC_kF_{2k+1}$, and $Q^2-X-Y-$ wherein $Q^2$, X, Y and k are as defined above.

Within the foregoing description, the following represents a particularly preferred subclass of Formula V monomers:

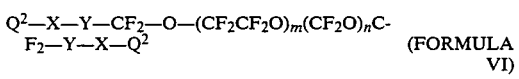 (FORMULA VI)

wherein m and n are as defined in Formula II and $Q^2$ is as defined in Formula V.

A particularly preferred class of laser-machinable polymers is prepared by the polymerization of the telechelic perfluoropolyether monomer and an ethylenically unsaturated monomer copolymerizable therewith. Other ingredients such as copolymerizable polyfunctional monomers and copolymerizable ethylenically unsaturated monomers containing a hydrophilic group may also be reacted with the telechelic pefluoropolyether monomer.

In the process of the invention, a laser-machinable contact lens having the desired curvature is prepared. This may be done by techniques which are known in the art including, for example, molding, casting, or machining individual lenses.

The lenses, as provided, have opposed anterior and posterior surfaces which are either adapted to provide the desired correction of visual acuity or which may be further processed to provide said desired correction. Additionally, the posterior surface either has a surface contour suitable for contact with the cornea or may be further processed to provide the desired contour.

The lens is contacted with a focussed laser beam which has a wavelength which is absorbed by the polymer and a beam energy such that the ratio $H_{AV}:H_{AB}$ is maximized. The lens is contacted with the beam at a desired distance from its centerpoint and about its centerpoint so as to form the desired peripheral edge. The lens may have any shape, e.g., circular, eliptical, triangular, but is most commonly circular.

The wavelength of the laser-supplied energy must be absorbed by the laser-machinable polymer. If it is not, the polymer will not be heated to a temperature adequate to permit it to vaporize. Within these guidelines, it has been found that the wavelength of the laser-supplied energy is not critical to the invention. It has been found that laser-supplied energy having a wavelength in the range of from 10 to 20 microns, and preferably a wavelength of 10.6 microns, is absorbed by most laser-machinable polymers, such as those prepared from telechelic perfluoropolyether monomers and polysiloxanes that contain hydrophilic side chains. Carbon dioxide lasers provide beams whose energy has a wavelength in this range.

The ratio of $H_{AV}:H_{AB}$ must be maximized so as to minimize the depth of the heat affected zone. Under these circumstances the temperature of the surface of the lens proximate the point of contact of the laser beam will quickly rise to its threshold temperature (i.e., the temperature at which the surface polymer will vaporize) while the temperature of the polymer in the area beneath the point of contact will rise only slightly by comparison. Thus, in the most preferred case, $H_{AB}$ is essentially zero and virtually all of the energy supplied to the polymer is absorbed in vaporization of the polymer.

As temperature of the polymer in the area beneath the point of contact increases, the heat absorbed in the bulk of the lens accumulates and does not have adequate time to diffuse into the remainder of the contact lens, as is reflected by an increase in the value of $H_{AB}$. This causes the heat affected zone to enlarge. Under these circumstances it is believed that the polymer in the area beneath the point of contact reaches its critical temperature too quickly, i.e., at essentially the same time as the surface polymer, resulting in eruptions of this subsurface material. Such subsurface eruptions produce irregularities such as grooves, pits, scallops and the like and generally render the resultant edge unacceptable.

It has been found that a laser beam which delivers an energy density in the range of $10^2$ to $10^5$ joules/cm$^2$ (preferably in the range of $10^3$ to $10^4$ joules/cm$^2$) to the surface of the polymer being cut provides a lens having a satisfactory peripheral edge. Such energy densities may be delivered to the surface of the lens by employing a laser beam having a power density in the range of $10^2$ to $10^7$ watt/cm$^2$ (preferably in the range of $10^3$ to $10^4$ watt/cm$^2$) for the appropriate duration, preferably one in the range of from 150 to 400 msec.

Other conditions may be utilized. However, it has been found that at lower energy densities (e.g., below $10^3$ joules/cm$^2$) more heat may be absorbed into the bulk of the lens so that the heat affected zone may become significant. It has also been found that at higher energy densities (e.g., above $10^5$ joules/cm$^2$) the efficiency of the process drops.

Preferably, the laser beam utilized is focussed so as to provide the highest energy density and the smallest heat affected zone.

In the process of the invention, the laser beam contacts the lens about its center point. This may be accomplished by rotating the lens about its center point while utilizing a fixed laser beam; rotating a laser beam radially about the center point of a fixed lens; or rotating both the lens and the laser beam radially about the center point of the lens at a rate of 200 to 800 rpm for from 1 to 5 revolutions. Other techniques may, of course, be used.

The angle of incidence of the laser beam to the lens is not critical to the invention and is selected so that the desired edge contour will result. It has been discovered that shallow angles of incidence are preferred. Angles of incidence in the range of from $-50°$ to $0°$ or from $90°$ to $120°$ from the vertical are useful.

The thickness of the contact lens edged by the method of the invention is not critical. However, thickness does influence the length of time necessary to provide the final edge. It has been found that lenses having a thickness in the range of from 0.05 millimeters (mm) to 0.5 mm may be successfully edged by the present invention. Thinner or thicker lenses may be edged if desired.

The edge produced by the process of the invention is preferably physiologically acceptable and requires no further processing. However, the present invention also encompasses those situations in which the edges produced require some polishing to remove small scale defects. The edge produced by the process of the invention also preferably exhibits an edge contour having smooth and continuous transition points between the body of the lens and the edge and between the anterior and posterior portions of the lens. Most preferably, the edge contour is such that the tangent to the surface of the edge always has a negative slope as one goes from the optical zone to the edge of the lens along the anterior surface.

During the process of the invention various by-products such as off-gasses, fractionated polymer groups, and the like may be generated. These by-products may be removed from the lens by directing a stream of gas across the edge being cut essentially simultaneously with the cutting operation, soaking the cut lens in a suitable solvent, or contacting the cut lens with a suitable solvent in an ultrasonic chamber. Combinations of these techniques may be employed if desired.

In the event that solvent soaking is employed it is preferably begun within one hour of forming the lens edge, and may be carried out at ambient conditions for up to 45 minutes. In the event that ultrasonic treatment is employed, it is preferably begun within one hour of forming the lens edge and is carried out at 30° C. for from about 0.5 to 2 min. However, longer or shorter times may be used if desired.

Solvents suitable for removing by-products include those which dissolve the by-products but do not materially affect the lens. Examples of suitable solvents include acetone, methyl ethyl ketone (MEK), methylene chloride, and a 50/50 mixture of MEK/isopropanol.

Turning now to the Figures, FIG. 1 is an enlarged edge view of a portion of a contact lens 2 prepared according to the present invention. Lens 2 has contoured, physiologically acceptable peripheral edge 3 which comprises a smooth continuous surface. This surface has upper compound curvature A-B and lower compound curvature (or posterior edge lift) B-C. There is a smooth transition between the upper and lower compound curvatures at their point of intersection B and between each of said curvatures and the body of lens 2 at the point of intersection A with anterior surface 15 and the point of intersection C with posterior surface 16.

The edge shown in FIG. 1 is but one embodiment of a contoured, physiologically acceptable peripheral edge which may be found on a contact lens according to the method of the invention. Other edges are also possible as will be understood by those skilled in the art.

Figure 2:
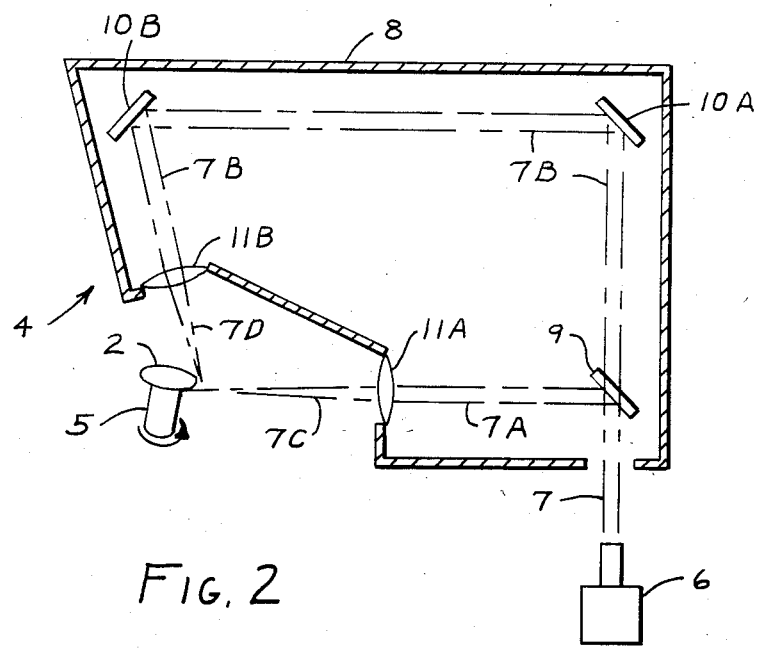
FIGS. 2-5 are schematic representations of various embodiments of apparatuses useful in the process of the present invention. The apparatus of FIG. 2 employs a rotating contact lens support and two fixed, focussed laser beams. The apparatus of FIG. 3 employs a fixed contact lens support and two rotating focussed laser beams. The apparatus of FIG. 4 employs a single fixed, focussed laser beam and a rotating contact lens support. The support is located on a rotary stage and may also be moved in X and Y directions on the stage. The X and Y directions are at an angle of 90° with respect to each other and provide adjustability of the incidence point of the laser beam. The apparatus of FIG. 5 employs a single fixed laser beam and a rotating lens support. The angle of incidence of the beam to the lens may be varied.
Figure 3:
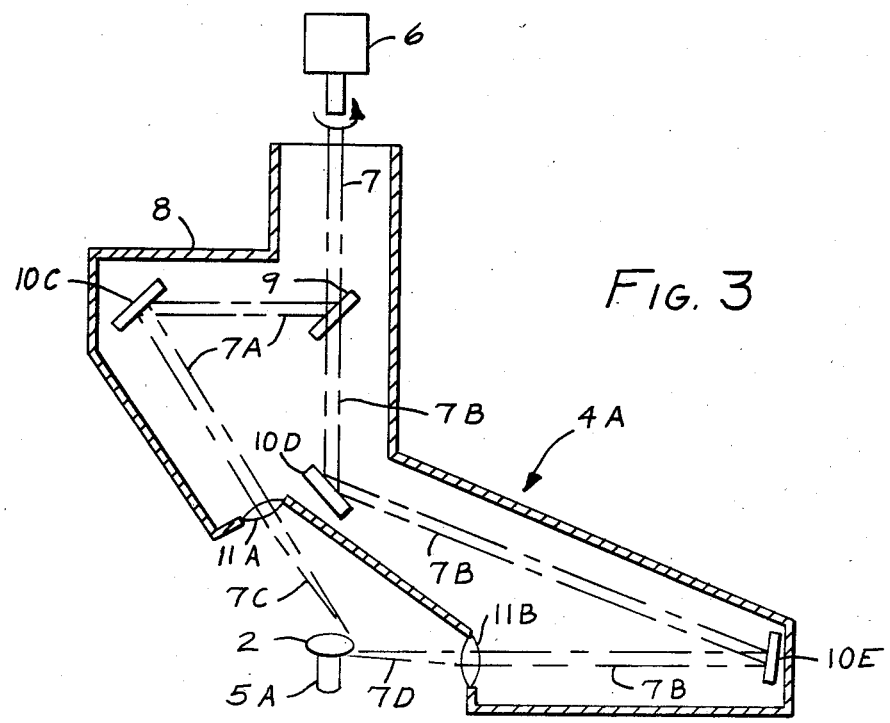
Figure 4:
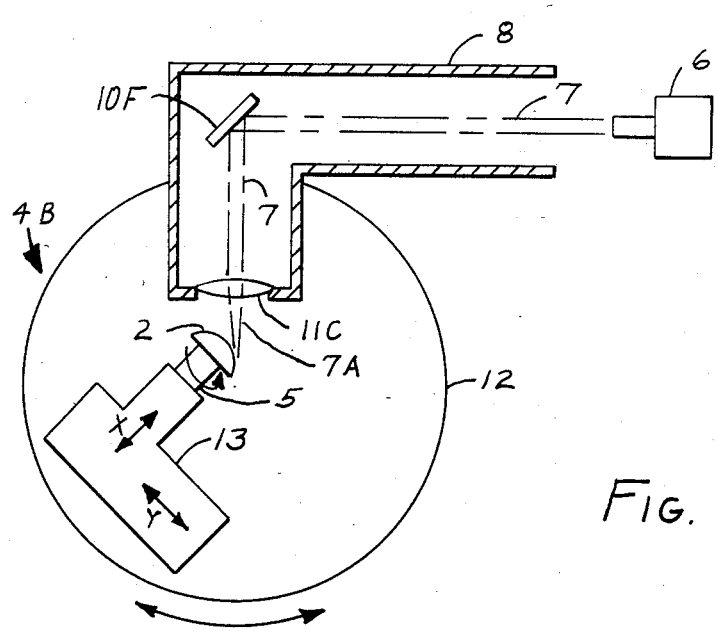
Figure 5:
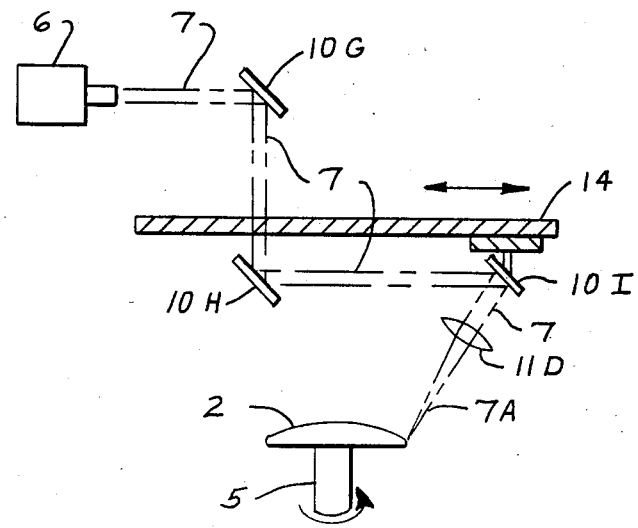

FIGS. 2-5 show various devices which may be used to carry out the method of the invention. Thus, FIGS. 2 and 3 illustrate devices in which two individually aligned optical paths originating from a single beam splitting means are used to deliver the laser beam to the lens. FIG. 4 illustrates the use of a single optical path to deliver the laser beam to the lens. FIG. 5 illustrates the use of a single optical path whose angle of incidence may be varied.

More specifically, FIG. 2 shows a device 4 employing a rotatable lens support 5, a source 6 of laser-supplied energy and a housing 8. Contained within housing 8 is an optical train comprising beam splitting means 9, mirrors 10A, and 10B, and focussing means 11A and 11B, here focussing lenses.

In operation, source 6 supplies laser energy in the form of beam 7. Beam 7 is directed at splitting means 9 where a portion 7A of beam 7 is deflected by means 9 and a portion 7B of beam 7 passes through means 9. Means 9, often referred to as a beam splitter, may comprise an at least partially reflective device such as dichroic mirror comprising a dielectric coating on a substrate transmissive to the wavelength of the incident laser beam.

After being split, beam 7A is directed through focussing means 11A while beam 7B is reflected by mirror 10A to mirror 10B and then directed to focussing means 11B. Focussed beams 7C and 7D then contact opposite sides of lens 2 and vaporize the edge material to produce the desired edge profile.

Focussed beams 7C and 7D contact the lens consecutively, that is one contacts one side of lens 2 until the desired edge is provided, after which the other contacts the other side of lens 2 until the final edge profile is provided. This may be accomplished by providing shutters in device 4 to permit a given beam to contact lens 2 only at a predetermined time.

As shown in FIG. 2, lens 2 is rotated about its center point by support 5 as focussed beams 7C and 7D contact it at a constant distance from its center point. The lens is preferably situated with respect to the device 4 such that the smallest possible beam area strikes it. However, by-products generated during cutting may interfere with the cutting operation. The degree of interference increases as the power density supplied increases.

FIG. 3 shows a device 4A similar to device 4 of FIG. 2. Device 4A differs from device 4 in that beam 7A is directed to focussing means 11A by mirror 10C while beam 7B is directed to focussing means 11B by mirros 10D and 10E. Device 4A further differs from device 4 in that lens 2 is held on fixed support 5A while the device 4A causes focussed beams 7C and 7D to rotate radially about the center point of lens 2.

FIG. 4 shows yet another device 4B useful in the present invention. This device employs a single fixed laser beam 7 which is reflected by mirror 10F to focussing means 11C. After passing through focussing means 11C, focussed beam 7A then contacts the edge of lens 2. Device 4B further comprises a rotatable support 5, a rotary stage 12, and an X-Y positioning stage 13. Rotary stage 12 is adjustable so that the angle of incidence of beam 7A to lens 2 can be appropriately adjusted to provide the desired edge profile. The X-Y stage provides adjustability in the indicated directions so that lenses 2 of differing diameters and/or base curves may be appropriately positioned. As is done in the apparatus of FIG. 2, support 5 rotates lens 2 about its center point as focussed beam 7A contacts it. The use of a single laser beam, such as is illustrated in FIG. 4 necessitates that lens 2 be turned over once the edge has been formed on a first surface so that the complete edge may be formed.

FIG. 5 shows still another device useful in the present invention. It employs a source 6 of laser-supplied energy, mirrors 10G, 10H and 10I, moveable platform 14, focussing lens 11D and rotatable lens support 5. Mirror 10I is pivotable. In operation, beam 7 is directed by means of mirrors 10G, 10H and 10I toward lens 11D. Lens 11D focusses the beam. Focussed beam 7A is then directed at contact lens 2. Mirror 10I is pivotable so that the angle of incidence of the beam to the lens may be varied as desired. Platform 14 is movable so as to accomodate lenses having different diameters and/or base curves in the apparatus.

The following examples further illustrate the present invention. In these examples a Model 42 CW carbon dioxide laser available from Coherent, Inc. was used. The laser was adjusted to provide a spot having a diameter of approximately 100 microns. The following operating parameters are reported in the examples:

a. Energy Density—the quantity of energy per square centimeter of laser beam delivered to the lens being edged.

b. Power Density—the amount of power per square centimeter of beam contained in the laser beam contacting the lens.

c. Duration—the length of time that the laser beam struck the lens.

d. Turns—the number of 360° revolutions of the laser beam about the center point of the lens.

EXAMPLES 1-30

The suitability of a telechelic perfluoropolyether monomer as a laser-machinable organic polymer was determined. The polymer was prepared from the following ingredients:

| | Weight % |
|---|---|
| Telechelic perfluoropolyether monomer prepared according to Example 1 of Serial No. 340,473 filed January 18, 1982 | 82.5 |
| Methyl methacrylate | 10 |
| N—vinylpyrrolidone | 7 |
| 2-hydroxy-2-methyl-1-phenyl-1-propanone | 0.5 |

A solution of these ingredients was prepared in a flask and then frozen by immersing the flask into liquid nitrogen. The flask was evacuated for five minutes at a pressure of 1 Torr and then allowed to warm to room temperature (with the contents under reduced pressure). This freeze/thaw procedure was performed a total of three times in order to eliminate dissolved oxygen. The flask was then transferred to a nitrogen filled glove bag and a portion of the contents were charged into an ultraviolet light-transmissive mold by means of a syringe. The mold was removed from the glove bag after it was loaded and was then suspended in a vertical position and subjected to radiation from a RS sunlamp positioned 18 cm away. After five minutes the mold was rotated 180° and irradiation continued for an additional 55 minutes. The mold was opened and the resulting 0.2 mm thick sheet of crosslinked organic polymer was removed.

The sheet was cut into small rectangles. Individual rectangles were placed on the lens support of an apparatus of the type shown schematically in FIG. 2. Circular cuts (9 mm diameter) were made partially through each rectangle to study the various operating conditions. All data is for one revolution of the lens support. The operating conditions employed and the results achieved are shown in Table 1.

TABLE 1

| Example | Power Density × $10^3$ (Watts/cm$^2$) | Energy Density × $10^3$ (Joules/cm$^2$) | Duration (msec) | Ranfer Value |
|---|---|---|---|---|
| 1 | 3.6 | 1.3 | 375 | 4 |
| 2 | 3.6 | 3.6 | 1000 | 5 |
| 3 | 3.6 | 5.4 | 1500 | 3 |
| 4 | 5.2 | 1.3 | 250 | 3 |
| 5 | 5.2 | 3.5 | 666 | 5 |
| 6 | 5.2 | 5.2 | 1000 | 5 |
| 7 | 8.8 | 1.3 | 150 | 5 |
| 8 | 8.8 | 3.5 | 400 | 4.5 |
| 9 | 8.8 | 5.3 | 600 | 4.5 |
| 10 | 24.0 | 1.3 | 55 | 2 |
| 11 | 24.0 | 3.5 | 148 | 2.5 |
| 12 | 24.0 | 5.3 | 222 | 4 |
| 13 | 7.9 | 2.3 | 288 | 2 |
| 14 | 11.6 | 2.3 | 200 | 1.75 |
| 15 | 15.9 | 2.3 | 144 | 2.5 |
| 16 | 7.9 | 2.9 | 361 | 2.5 |
| 17 | 11.5 | 2.9 | 260 | 2.25 |
| 18 | 15.9 | 2.9 | 180 | 2 |
| 19 | 8.8 | 3.5 | 400 | 4.5 |
| 20 | 15.9 | 0.9 | 55 | 5 |
| 21 | 19.5 | 0.9 | 45 | 1.75 |
| 22 | 20.5 | 2.8 | 139 | 2 |
| 23 | 5.3 | 1.3 | 241 | 4 |
| 24 | 16.9 | 4.3 | 252 | 3.5 |
| 25 | 14.3 | 4.6 | 325 | 5 |
| 26 | 22.2 | 4.6 | 208 | 3.5 |
| 27 | 19.5 | 5.1 | 263 | 4.5 |
| 28 | 6.2 | 2.8 | 457 | 3.5 |
| 29 | 22.2 | 4.6 | 208 | 3 |
| 30 | 14.3 | 4.6 | 325 | 4.5 |

These data demonstrate that the polymer is laser-machinable. Thus, examples 4, 13, 14–18, 21, 22 and 29 define a region where the Ranfer Values are less than three when tested according to the Ranfer Value determination described above.

EXAMPLE 31

An apparatus of the type represented schematically in FIG. 2 was employed to cut 9 mm diameter discs from a 0.08 mm thick sheet of the crosslinked organic polymer of example 1 of Ser. No. 340,473 filed 1/18/82 using the method of manufacture of Example 2 of that application. A constant duration was employed for each of three different power densities. A stream of nitrogen gas having a flow rate of 13 cubic feet per hour was directed at the lens. This caused some waving of the sheet which in turn resulted in varying angles of the cut and various edge contours. However, all cuts were acceptable and had an edge taper of about 32° from the horizontal. The operating conditions employed are set out in Table 2.

TABLE 2

| Power Density × 10³ (Watts/cm²) | Energy Density × 10³ (Joules/cm²) | Duration (msec) |
|---|---|---|
| 1.2 | 1.8 | 1500 |
| 0.3 | 0.4 | 1500 |
| 0.6 | 0.9 | 1500 |

EXAMPLE 32

An apparatus of the type represented schematically in FIG. 2 was employed to provide edges on 0.3 mm thick contact lenses comprising a polymer of the telechelic perfluoropolyether monomer of Example 2 of Ser. No. 340,473 filed 1/18/82. A power density of $2.2 \times 10^4$ watts/cm², an energy density of 94.6 joules/cm², and a duration of 4.3 msec was employed. The surface of the cut edge of the lenses was smooth and free from burrs and debris. The edge was tapered such that it provided a round top area at the edge closest to the incident laser beam. The resulant cut was acceptable.

EXAMPLE 33

Lenses comprising a telechelic perfluoropolyether monomer prepared from the monomer of Example 5 of Ser. No. 340,473 filed 1/18/82 were laser cut using an apparatus of the type illustrated schematically in FIG. 2. The lenses were molded as described in Example 1 above except that a circular mold was utilized. They were approximately 0.1 to 0.15 mm thick and had a diameter of approximately 10.2 mm. A power density of $2.2 \times 10^4$ watts/cm², a duration of 500 msec., and an energy density of $1.1 \times 10^4$ joules/cm² was employed. A nitrogen gas jet 10 cfm was used to remove debris. The edge of the cut lens was smooth but had some spider web debris on it. The lens was ultrasonically cleaned in acetone in an ultrasound apparatus from Branson, Inc. for 2 minutes, then inspected. Substantially all of the spider web debris was removed by ultrasonic cleaning.

When this example was repeated using a power density of $2.3 \times 10^4$ watts/cm², a duration of 600 msec. and an energy density of $1.4 \times 10^4$ joules/cm², the edge of the cut lens was again observed to be smooth with some spider web debris. The debris was removed by ultrasonic cleaning in acetone for two minutes.

EXAMPLE 34

A copolymer comprising the polymerization product of 72.7 weight percent telechelic perfluoropolyether monomer prepared according to Example 17 of Ser. No. 340,473 (filed 1/18/82), 21.9 weight percent methyl methacrylate and 5.4 weight percent hydroxyethyl methacrylate was laser cut using an apparatus of the type illustrated schematically in FIG. 2. Separate power densities of $1.1 \times 10^3$ and $3.4 \times 10^3$ watts/cm² were used to make separate cuts under air, nitrogen, and carbon dioxide. The edges were unacceptable. The samples were then ultrasonically cleaned. The samples were ultrasonically cleaned in acetone for one minute. The ultrasonic cleaning did not render the edges acceptable. The time between the completion of cutting and the commencement of ultrasonic cleaning was from 3 to 5 seconds.

EXAMPLE 35

A copolymer prepared from composition 3 of Example 5 of Ser. No. 340,473 filed 1/18/82 (50 weight percent telechelic perfluoropolyether monomer and 50 weight percent methylmethacrylate) was laser cut. The laser was set at a power density of $2.9 \times 10^4$ watts/cm², a duration of 4.3 millisec. and an energy density of $1.2 \times 10^2$ joules/cm². The apparatus used in schematically represented in FIG. 1. The edge produced had a steep profile with a rough, beaded surface. It was not an acceptable edge.

EXAMPLE 36

Example 31 was repeated except that a 0.08 mm thick sheet of a 60/40 silicone/methyl methacrylate polymer was used. The silicone monomer had the formula

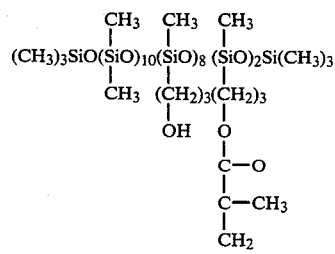

It was prepared according to the procedures described in U.S. Pat. No. 4,261,975. Polymerization was carried out by ultraviolet radiation in the presence of 0.25% by weight diethoxyacetophenone.

The laser cut almost completely cut through the materail at a power density of $5.9 \times 10^4$ watts/cm². The trimmed edges were acceptable and had an edge taper of 65°. The stream of gas directed at the sheet again caused some waving resulting in some irregularity of the trimmed edge. The stream of gas also tended to cool the lens and cause debris from the cut to condense on the edge. However, the debris was removed by ultrasonic cleaning in acetone.

We claim:

1. A method of forming a peripheral edge on a contact lens prepared from a laser-machinable, organic polymer, said method comprising the steps of:
    providing a focused laser beam having
    (a) a wavelength which is absorbed by said polymer and
    (b) a beam energy wherein the rate of radiated energy supplied to said polymer is such that the ratio of heat absorbed in vaporization of said polymer to heat absorbed by said polymer bulk is maximized;
    contacting said lens with said laser beam at a distance from the centerpoint of said lens; and
    rotating said laser beam and said lens relative to one another about the center point of said lens so as to form the desired edge contour.

2. A method according to claim 1 wherein said beam has a wavelength in the range of from 10-12 microns.

3. A method according to claim 2 wherein said beam has a wavelength of 10.6 microns.

4. A method according to claim 1 wherein said beam strikes said lens at an angle selected from about −50° to 0° from vertical.

5. A method according to claim 1 wherein said lens is rotated about its center point while said beam is held constant.

6. A method according to claim 1 wherein said lens and said beam are each rotated about the center point of said lens, said rotations being opposed to one another.

7. A method according to claim 1 further including the step of placing said lens in a solvent which dissolves debris formed during vaporization of said polymer but is inert to said lens and subjecting said lens to ultrasonic vibration in said solvent for a time sufficient to remove debris from said lens without otherwise affecting said lens.

8. A method according to claim 7 wherein said solvent is selected from acetone or methyl ethyl ketone.

9. A method according to claim 8 wherein said lens is subject to said ultrasonic vibration for from 0.5 to 2 minutes.

10. A contact lens having edges formed in accordance with the method of claim 1.

11. A method according to claim 1 wherein said polymer is crosslinked.

12. A method according to claim 11 wherein said crosslinked polymer (a) is prepared from compositions containing less than 50 weight percent of a monomer selected from the group consisting of acrylate monomer and methacrylate monomer and (b) contains less than 2 weight percent of a material selected from the group consisting of hydroxyalkyl acrylate and hydroxyalkyl methacrylate.

13. A method according to claim 11 wherein said crosslinked polymer is selected from the group consisting of (a) polymers prepared from telechelic perfluoropolyether monomers and (b) polysiloxanes containing hydrophilic side chains.

14. A method according to claim 13 wherein said crosslinked polymer is a polysiloxane containing hydrophilic side chains.

15. A method according to claim 13 wherein said crosslinked polymer is prepared from telechelic perfluoropolyether monomers.

16. A method according to claim 15 wherein said monomer has a backbone of perfluorooxyalkyl units, a number average molecular weight between about 500 and 15,000, and at least one group selected from consisting of groups that can be polymerized to form a polymer and groups that can be reacted to form a polymer.

17. A method according to claim 16 wherein said monomer has a backbone having the formula $$-(C_kF_{2k}O)_p-(C_qF_{2q})-$$

wherein "p" represents the number of randomly distributed repeating $-C_kF_{2k}O-$ subunits present and is an integer of from 3 to 200; "q" is an integer of from 1 to 4; and "k" is an integer of from 1 to 4.

18. A method according to claim 17 wherein said monomer has the formula $$Q-W-(C_kF_{2k}O)_p-(C_qF_{2q})-Z$$

wherein Q is selected from the group consisting of a group that can be polymerized and a group that can be reacted with a coreactant to form a polymer; W is a connecting group; and Z is selected from the group consisting of $-WQ$ and fluorine.

19. A method according to claim 1 wherein said focussed laser beam delivers an energy density in the range of $10^2$ to $10^5$ joules/cm$^2$ to said lens.

20. A method according to claim 1 wherein said lens is held constant while said beam is rotated about the centerpoint of said lens.

21. A method according to claim 1 wherein said beam strikes said lens at an angle selected from about 90° to 120° from vertical.

22. A contact lens having anterior and posterior surfaces joined together by a laser-formed, contoured, peripheral edge.

23. A contact lens according to claim 22 having a maximum Ranfer Value of 3.

24. A contact lens having an anterior surface, a posterior surface and an edge joining said anterior and posterior surfaces, wherein said edge is laser-formed, contoured, and physiologically acceptable.

25. A contact lens according to claim 24 wherein said edge has upper and lower compound curvatures which intersect (a) each other and (b) said anterior and posterior surfaces.

26. A contact lens according to claim 25 having smooth transitions at each of said intersections.

* * * * *